(12) United States Patent
Papen et al.

(10) Patent No.: US 10,730,188 B2
(45) Date of Patent: Aug. 4, 2020

(54) GRIPPING DEVICE FOR PACKAGE WITH DIMPLES

(71) Applicant: SANOVO TECHNOLOGY NETHERLANDS B.V., Aalten (NL)

(72) Inventors: Edwin Lambertus Maria Papen, Vorden (NL); Dirk Willem Wikkerink, Aalten (NL); Erik Pieter Van Gaasbeek, Borculo (NL); Hielke Dijkstra, Neede (NL)

(73) Assignee: SANOVO TECHNOLOGY NETHERLANDS B.V., Aalten (NL)

( * ) Notice: Subject to any disclaimer, the term of this patent is extended or adjusted under 35 U.S.C. 154(b) by 338 days.

(21) Appl. No.: 15/738,947

(22) PCT Filed: Jun. 23, 2016

(86) PCT No.: PCT/NL2016/050446
§ 371 (c)(1),
(2) Date: Dec. 21, 2017

(87) PCT Pub. No.: WO2016/209076
PCT Pub. Date: Dec. 29, 2016

(65) Prior Publication Data
US 2020/0086500 A1 Mar. 19, 2020

(30) Foreign Application Priority Data
Jun. 24, 2015 (NL) ...................... 2015019

(51) Int. Cl.
*B25J 13/08* (2006.01)
*B65B 23/02* (2006.01)
(Continued)

(52) U.S. Cl.
CPC ......... *B25J 13/082* (2013.01); *B25J 15/0023* (2013.01); *B25J 15/0028* (2013.01);
(Continued)

(58) Field of Classification Search
CPC .. B25J 13/082; B25J 15/0028; B25J 15/0023; B25J 15/0052; B65B 23/02; B65B 43/44; B65B 43/46; B65G 47/905
(Continued)

(56) References Cited

U.S. PATENT DOCUMENTS 3,509,995 A * 5/1970 Colaw .................... A63C 5/085
                                                        209/572
3,576,255 A * 4/1971 Warren ................... B65B 35/50
                                                        209/572
(Continued)

FOREIGN PATENT DOCUMENTS

CH          394930       6/1965
DE         29518548      2/1996
(Continued)

OTHER PUBLICATIONS

Sommer Automatic "Needle Gripper Pneumatic SCH-Series", Intrenet Citation, Aug. 9, 2010, pp. 33-39.
(Continued)

*Primary Examiner* — Paul T Chin
(74) *Attorney, Agent, or Firm* — Nixon Peabody LLP; Jeffrey L. Costellia (57) ABSTRACT

A gripping device for gripping an egg tray (3A) having a dimpled structure includes a gripping unit (4) that is movable up and down to engage and grip the egg tray (3A) and move it. The gripping unit comprises (4) at least a pair of opposite grip ping members (42A, 42B) which are movable in opposite directions, substantially transverse to the up and down movement of the unit (4), from a retracted position to an advanced position to grip a dimple (31) of the egg tray (3A), and from the advanced position to the retracted position to release the dimple. Each gripping member (42A, 42B) of said pair has a separate pressure operated actuator (46) operatively connected to it. The actuator (46), upon (Continued)

pressurization, moves the corresponding gripping member (42A, 42B) from the retracted position to the advanced position.

19 Claims, 4 Drawing Sheets (51) Int. Cl.
*B25J 15/00* (2006.01)
*B65B 43/44* (2006.01)
*B65B 43/46* (2006.01)
*B65G 47/90* (2006.01)
*B65G 59/10* (2006.01)

(52) U.S. Cl.
CPC .......... *B25J 15/0052* (2013.01); *B65B 23/02* (2013.01); *B65B 43/44* (2013.01); *B65B 43/46* (2013.01); *B65G 47/905* (2013.01); *B65G 47/907* (2013.01); *B65G 59/103* (2013.01)

(58) Field of Classification Search
USPC .................................. 294/198, 106; 414/607
See application file for complete search history.

(56) References Cited

U.S. PATENT DOCUMENTS

| | | | | |
|---|---|---|---|---|
| 3,759,563 A * | 9/1973 | Kitamura | ................. | B25J 9/041 294/198 |
| 4,304,433 A * | 12/1981 | Langowski | ............. | E21B 19/14 294/106 |
| 4,368,913 A * | 1/1983 | Brockmann | ......... | B25J 15/0266 294/106 |
| 4,765,487 A * | 8/1988 | Bliss | ...................... | B65G 57/24 209/510 |
| 6,056,341 A * | 5/2000 | Bliss | ...................... | B65G 47/90 294/106 |
| 6,155,153 A * | 12/2000 | Davison | ................. | B65G 57/14 414/792.2 |
| 6,237,978 B1 | 5/2001 | Bliss | | |
| 6,402,456 B1 * | 6/2002 | van Walderveen | ...... | B65G 1/07 414/794.9 |
| 7,490,883 B2 * | 2/2009 | Doppenberg | .......... | B65G 47/90 294/106 |
| 2009/0261609 A1 * | 10/2009 | Shibamoto | ............. | B25J 15/022 294/106 |
| 2012/0146353 A1 * | 6/2012 | Lunde | .................... | E21B 19/14 294/198 |

FOREIGN PATENT DOCUMENTS

| | | |
|---|---|---|
| EP | 0041304 | 12/1981 |
| FR | 2320882 | 3/1977 |
| GB | 2100708 | 1/1983 |
| NL | 125019 | 9/1968 |
| NL | 7504792 | 11/1975 |

OTHER PUBLICATIONS

International Search Report for PCT/NL2016/050446 dated Nov. 18, 2016.
Written Opinion for PCT/NL2016/050446 dated Nov. 18, 2016.
Dutch International Search Report for PCT/NL2016/050446 dated Jun. 24, 2015.
Dutch Written Opinion for PCT/NL2016/050446 dated Jun. 24, 2015.

\* cited by examiner

GRIPPING DEVICE FOR PACKAGE WITH DIMPLES

FIELD OF THE INVENTION

The present invention relates to a gripping device for gripping a package having a dimpled structure. The gripping device includes a gripping unit that is movable up and down to engage and grip the package and move it. The gripping unit comprises at least a pair of opposite gripping members which are movable in opposite directions, substantially transverse to the up and down movement of the unit, from a retracted position to an advanced position to grip a dimple of the package, and from the advanced position to the retracted position to release the dimple. Each gripping member comprises a pointed element to prick the material of the dimple to grip it.

BACKGROUND OF THE INVENTION

A gripping device of the described type is typically found in a denesting apparatus for denesting and discharging the lower tray or carton of a stack of nested product trays or cartons, for example associated to an egg packaging line.

FR 2320882 discloses a denesting apparatus for denesting dimpled trays. The denesting apparatus comprises two gripping units. The gripping units are mounted on a cross member that in its center is mounted to a piston rod of a central cylinder. Each gripping unit has at least three pivotable fingers and an intermediate cylinder. The fingers have a prick pin at their ends. The fingers of one gripping unit are operatively connected to the associated intermediate cylinder by a sliding plate. The fingers of one unit enclose a common dimple and, upon actuation of the associated intermediate cylinder, move radially inward over the same distance to grip the dimple. This known device has as for a disadvantage that the position of the dimples of the trays and the position of the gripping unit have to match quite accurately to assure a proper operation. If the gripping units and the dimples are mutually offset, the fingers will bump into the dimples and the fingers will not be able to enclose and grip the dimple in a correct way.

EP 0 041 304 A1 discloses a denesting apparatus for separating the lowest egg tray of a stack of egg trays. The denesting apparatus includes a gripping unit that is moveable up and down. The gripping unit comprises a bar provided with multiple gripping members that engage different dimples of the tray. The respective bars are linked to lever arms that are each pivotable about a shaft. The gripper members comprise prick pins for gripping into dimples of the egg tray. The mentioned pivot shafts are parallel and the prick pins are pointing in the opposite direction, whereby the opposing gripper members are each operating in a mutual opposite direction. The gripper members are connected to a mutually common actuator by means of links and a cam following system. The gripper members will thus all make the same stroke.

Although the denesting apparatus of EP 0 041 304 A1 already mitigates the problem of the denesting apparatus of FR 2320882 relating to the possible offset of the position of the dimples relative to the position of the grippers, it still is not satisfying.

Trays for eggs are often made of papier-maché (molded fiber) and their form may be somewhat irregular. Furthermore this type of trays is susceptible to changing dimensions over time, for example due to the presence of moist or dry air. Dimple-structure trays or boxes may also be made of plastics material and may have changing dimensions due to the application of heat for example during washing. The gripping members that are attached to the same common bar will move towards the respective dimples of the tray, but due to the rough and irregular shape of the tray and the dimples, not all gripping members may engage a dimple. When not all gripping members engage the dimples of the tray, the tray me be torn, and/or the tray may not be properly separated from the stack.

The invention has for an object to obviate this problem.

SUMMARY OF THE INVENTION

This object is achieved by a gripping device for gripping a package having a dimpled structure, the gripping device including a gripping unit that is movable up and down to engage and grip the package and move it, said gripping unit comprising at least a pair of opposite gripping members which are movable in opposite directions, substantially transverse to the up and down movement of the unit, from a retracted position to an advanced position to grip a dimple of the package, and from the advanced position to the retracted position to release the dimple, each gripping member comprising a pointed element to prick the material of the dimple to grip it, wherein each gripping member of said pair has a separate pressure operated actuator operatively connected to it, which actuator, upon pressurization, moves the corresponding gripper from the retracted position to the advanced position, whereby each respective gripping member is allowed to travel individually over the required distance from the retracted position to the advanced position to grip a respective dimple.

The respective gripping members are individually movable by their corresponding pressure operated actuator towards the respective dimples of the package, such that if the distance between the retracted position of the gripping members towards the individual dimples is different, each gripping member is allowed to travel individually the required distance to grip the dimple. In other words, each gripping member moves with a different stroke such that it certainly engages the corresponding dimple of the package. When the gripping member engages the corresponding dimple the pointed element, such as a gripping pin, in particular a gripping needle, pricks the material of the dimple whereby the package is securely gripped and the package may for example be separated properly from a stack by moving the gripping unit away from the stack.

In a possible embodiment the actuator is a pneumatic actuator.

In a further preferred embodiment the pressure operated actuators are connected to a common pressure source. This measure has the effect that each actuator is operated with the same pressure. This has the advantage that the gripping members engage the respective dimples of the package with the same force, independent of the distance that the gripping member has to travel before it engages the associated dimple.

In a further preferred embodiment of the gripping device according to the invention the gripping unit comprises a stop member positioned adjacent each one of the gripping members, and wherein the gripping member in the advanced position extends beyond the stop member and in the retracted position is withdrawn relative to the stop member. The stop member has the effect that the dimple structure package, such as an egg tray, is retained while the gripping member, which in practise often comprises a needle or another pricker is retracted out of the package material which may be papier-maché or cardboard. This provides the advantage that the package is released properly and that the package is for example not positioned obliquely on a further conveyor. Another effect of the feature that the gripping members are withdrawn relative to the stop surface is an increased safety for the personnel operating the apparatus. The withdrawn position shields the sharp elements of the gripping members such as needles or other prickers provided on the gripping members. The operating personnel will have less risk to wound itself when doing maintenance work or solve failure of the apparatus.

This aspect of the stop member is applicable in a gripping device independently of the aspect that each of the gripping members is operatively connected to a separate actuator to move the gripping members to and from the advanced position and retracted position. Thus, also in an embodiment in which the gripping members are attached to the same common bar and will move towards and away from the respective dimples of the package (e.g. a tray) simultaneously, the stop member will provide the advantage that the package is released properly and that the package is for example not positioned obliquely on a further conveyor.

In a possible embodiment the gripping unit has two pairs of gripping members. By the two pairs gripping members the package, such as a tray, can at least be engaged at spaced apart locations lying on a rectangle or square whereby the package is held straight.

In a further possible embodiment the device has a plurality, preferably two gripping units. When each unit has two pairs of gripping members, the package, e.g. a tray, will be engaged by eight gripping members at eight dimples. Hereby the package is readily held level by the gripping units. Preferably the gripping units are placed in line.

In a further possible embodiment each of the gripping members is mounted on a lever arm which is pivotally mounted to a gripping unit base and wherein the actuator operates on one end of the lever arm and the gripping member is mounted on the other end adapted to engage the dimple of the package. In particular said other end is provided with a needle or other pricker to pierce the package material. In a preferred embodiment the distance of the end where the actuator operates on the lever arm towards the rotation axis is smaller than the distance of the end where the needle, pricker or other element is provided towards the rotation axis.

The invention also relates to a denesting apparatus for denesting and discharging a lower package of a stack of nested packages having a dimpled structure, wherein the denesting apparatus includes a gripping device as described in the above to engage and grip the lower or upper package of the stack and to separate the lower or upper package from the stack.

The invention also relates to the use of a denesting apparatus as described above in denesting a stack of egg trays or cartons.

Another aspect of the invention relates to a denesting apparatus for denesting and discharging a lower package of a stack of nested packages having a dimpled structure, wherein each dimple is adapted to receive a product such as an egg or fruit and isolate it from other same products placed in the package, wherein the denesting apparatus includes a gripping device for gripping a package having a dimpled structure, the gripping device including a gripping unit that is movable up and down to engage and grip the package, said gripping unit comprising at least two gripping members operating in a mutual opposite direction and each movable in a substantially transverse direction from an advanced position to a retracted position and vice versa to so as to grip and to release each a dimple of the tray or carton, wherein each of the gripping members is operatively connected to a separate actuator to move the gripping members to and from the advanced position and retracted position.

The actuators in the gripping device may be a pressure operated actuator, preferably a pneumatic actuator. Preferably, the pressure operated actuators are connected to a common pressure source, whereby each actuator is operated with the same pressure. This has the advantage that the gripping members engage the respective dimples of the package with the same force, independent of the distance that the gripping member has to travel before it engages the associated dimple.

In another possible embodiment the actuator includes a spring element. This spring mechanism allows that when the pointed elements are moved towards the respective dimples simultaneously, some pointed elements just travel a longer way before they reach a dimple, which is allowed by the spring element associated to the respective pointed elements.

In a further embodiment each of the gripping members comprises at east one pointed element such as a gripping pin, in particular a gripping needle.

In a possible embodiment the gripping unit comprises a stop member positioned adjacent each one of the gripping members, and wherein the gripping member in the advanced position extends beyond the stop member and in the retracted position is withdrawn relative to the stop member.

In a possible embodiment the gripping unit has two pairs of gripping members.

In a possible embodiment the device has a plurality, preferably two gripping units.

In a possible embodiment each of the gripping members is mounted on a lever arm which is pivotally mounted to a gripping unit base and wherein the actuator operates on one end of the lever arm and the gripping member is mounted on the other end adapted to engage the dimple of the package.

The invention will be described in more detail in the following description with reference to the drawings.

DETAILED DESCRIPTION

Figure 1:
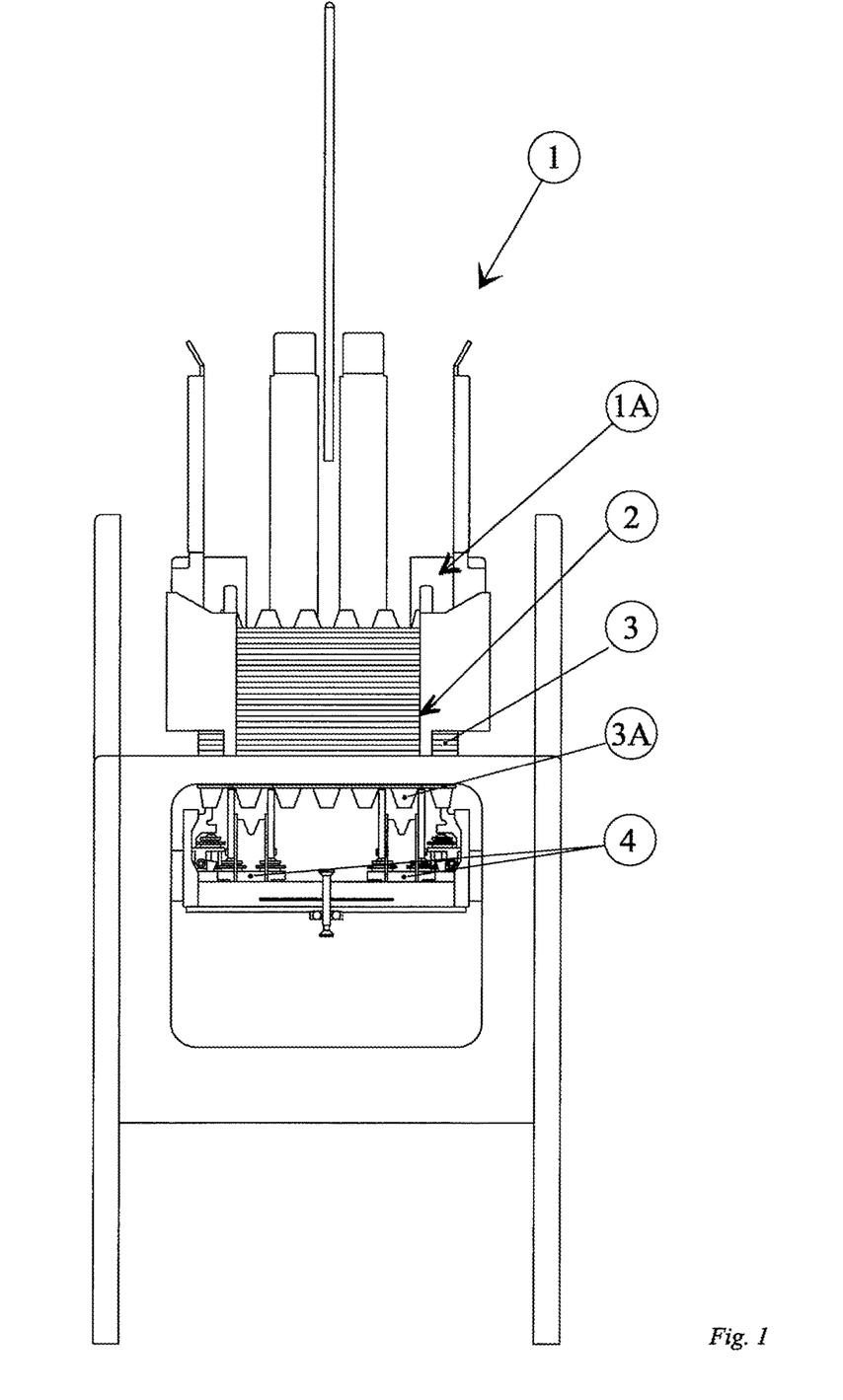
FIG. 1 shows a front elevational view of a denesting apparatus according to the invention.

In FIG. 1 is shown a denesting apparatus 1. The denesting apparatus 1 has a storage 1A holding a stack 2 of trays 3. The trays 3 have dimpled structure and are used for packaging eggs. At a lower end of the storage 1A the denesting apparatus 1 has an assembly of gripping units 4 to grip the lower tray 3A of the stack 2. The gripping units 4 are movable up and down, thus movable towards the lower end of the stack 2 and away from the lower end of the stack 2 such that the lower tray 3A can be gripped and separated from the stack 2.

Figure 5:
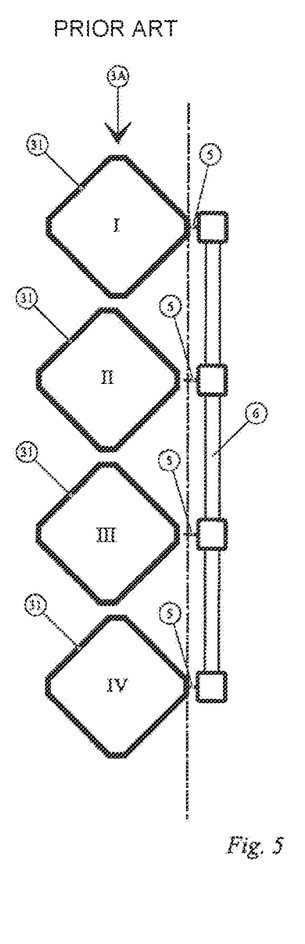
FIG. 5 illustrates schematically how a tray is engaged by gripping members according to the prior art.

In FIG. 5 is shown schematically from above an outer row of dimples 31 of a tray 3A is shown. Egg trays are often made of papier-maché, molded fiber or cardboard, and these trays are often not form stable during use. For example the humidity in a room or moist may be absorbed (locally) by the tray whereby the dimensions and shape of the tray may change over time. As is illustrated in FIG. 5 the dimples of the outer row are not perfectly aligned. The dimples 31 indicated by I and IV are located more to the outside than the dimples 31 indicated by II and III. The irregular shape of trays or other egg packages (e.g. boxes) is not limited to trays or packages made of papier-maché, molded fiber or the like, but is also possible with trays or packages of other material. For example trays or other egg packages may be made of plastics material, which may also be irregularly shaped for example due to deformation by the influence of heat, e.g. by washing the tray.

In FIG. 5 is illustrated that gripping members are formed as needles 5. These needles 5 are all mounted to one common support bar 6. This has the effect that all needles 5 are moved the same distance towards the respective dimples I-IV, but that only the most outwardly located dimples I and IV are engaged by their corresponding needles 5. The more recessed dimples II and III cannot be reached by the corresponding needles 5. As a consequence the tray 3A will not be gripped as firmly as would be the case when the tray 3A would have its perfect regular shape. As a result of the deficient gripping of the tray 3A, the tray 3A me be ruptured, and/or the tray 3A may not be properly separated from the stack 2 when the needles 5 are moved down with the support bar 6.

Figure 6:
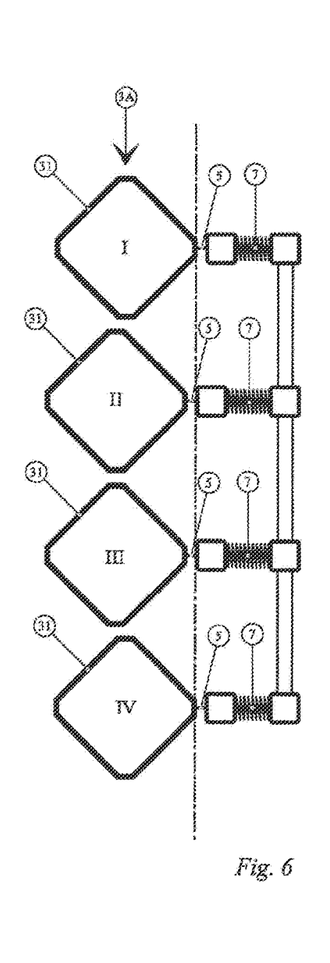
FIG. 6 illustrates schematically how a tray is engaged by gripping members of a possible embodiment of the denesting apparatus according to the invention.

In FIG. 6 is schematically shown an embodiment wherein the needles 5 are not mounted directly to a common support bar, but are mounted to a support with an intermediate spring element 7. This spring mechanism allows that each one of the needles 5 can engage the corresponding dimple in the tray 3A. In a practical embodiment the needles 5 are moved towards the respective dimples simultaneously, but some needles 5 just travel a longer way before they reach a dimple, which is allowed by the spring mechanisms present at the respective needles. In that regard it provides an improvement with respect to the prior art mechanism of FIG. 5. At the dimples I and IV, which in this figure are situated the most outwards, the corresponding spring element 7 will be the most compressed whereby the force with which the needle 5 engages the corresponding dimple I, IV is higher than the force at which the dimples II and III are engaged by their corresponding needles 5.

A too strong force by one or more of the needles may cause that two trays are pulled down together from the stack, which causes an interruption of normal operation of the apparatus.

Figure 7:
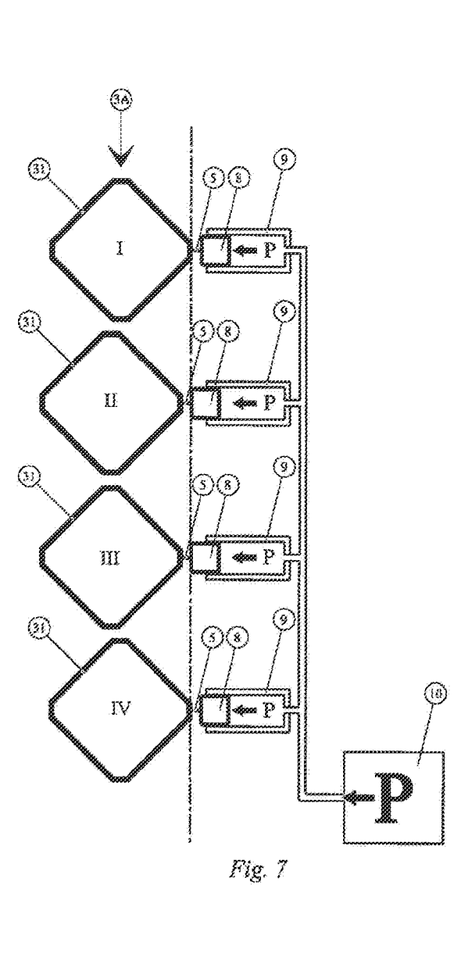
FIG. 7 illustrates schematically how a tray is engaged by gripping members of a preferred embodiment of the denesting apparatus according to the invention.

In FIG. 7 an embodiment is schematically shown wherein the needles 5 are mounted to an actuator that is operated by pressure. In this schematic example the actuator is depicted as a plunger 8 which on its outer end is provided with the needle 5. The plunger 8 is movable in a cylinder 9 that is fed with pressure from a pressure source 10. All cylinder-plunger assemblies are connected to the same pressure source 10 and thus operated with the same pressure, whereby all needles 5 engage the respective dimples I-IV with the same force, irrespective of the exact mutual position of the dimples I-IV. In other words, the dimples I and IV, that are, like in the previous examples, the most outwards dimples, are engaged with the same force as the dimples II and III which have a more recessed position. Preferably, compressed air is used as a pressure medium. Because all needles engage the corresponding dimples with the same predetermined force, a too strong or too weak engagement between needles and their corresponding dimple I-IV can be prevented. Thereby the risk of failure or interruption of the normal operation of the denesting apparatus is reduced.

Figure 2:
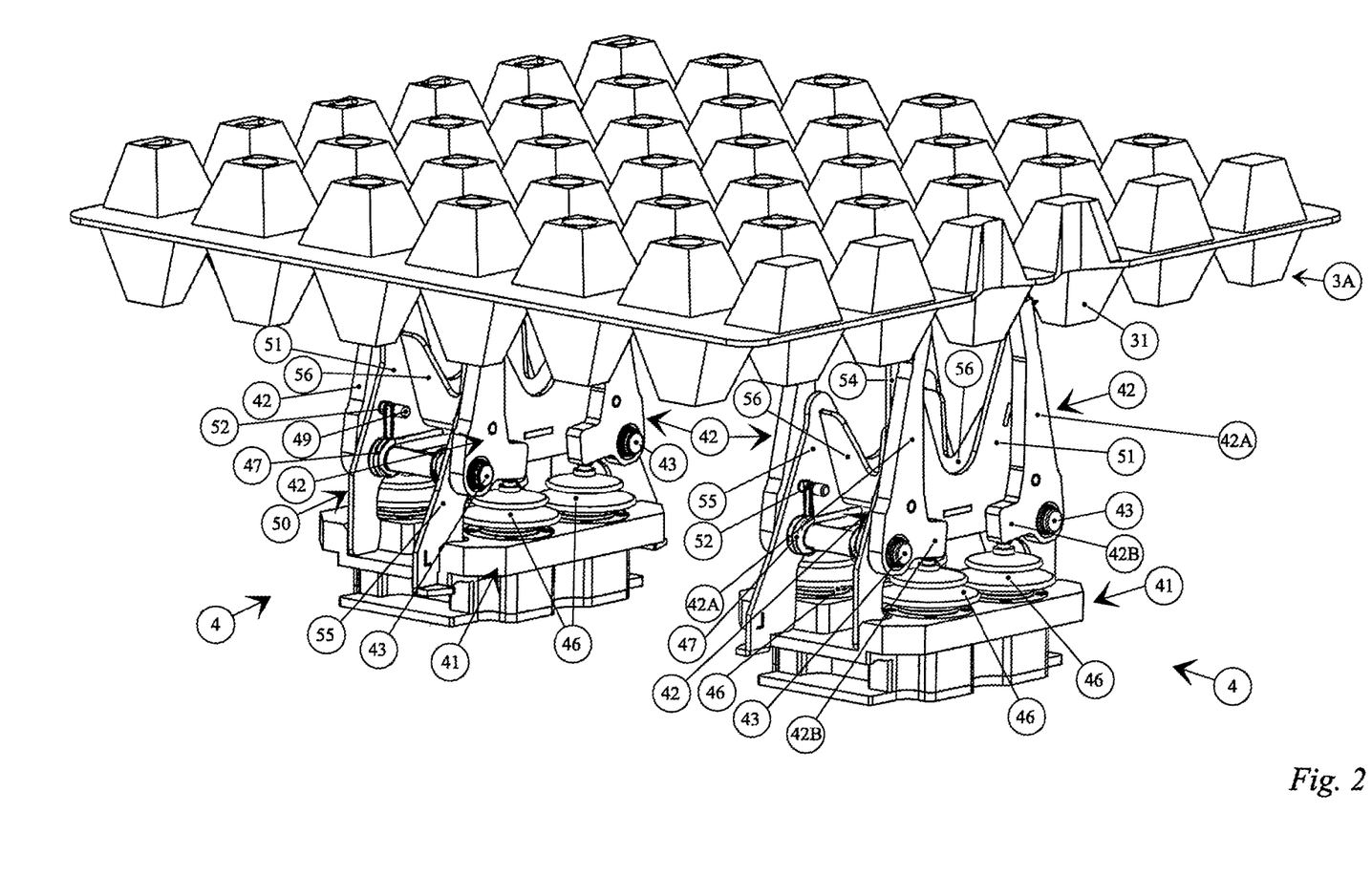
FIG. 2 shows in a view in perspective a tray and two gripping units of the denesting apparatus according to the invention.
Figure 3:
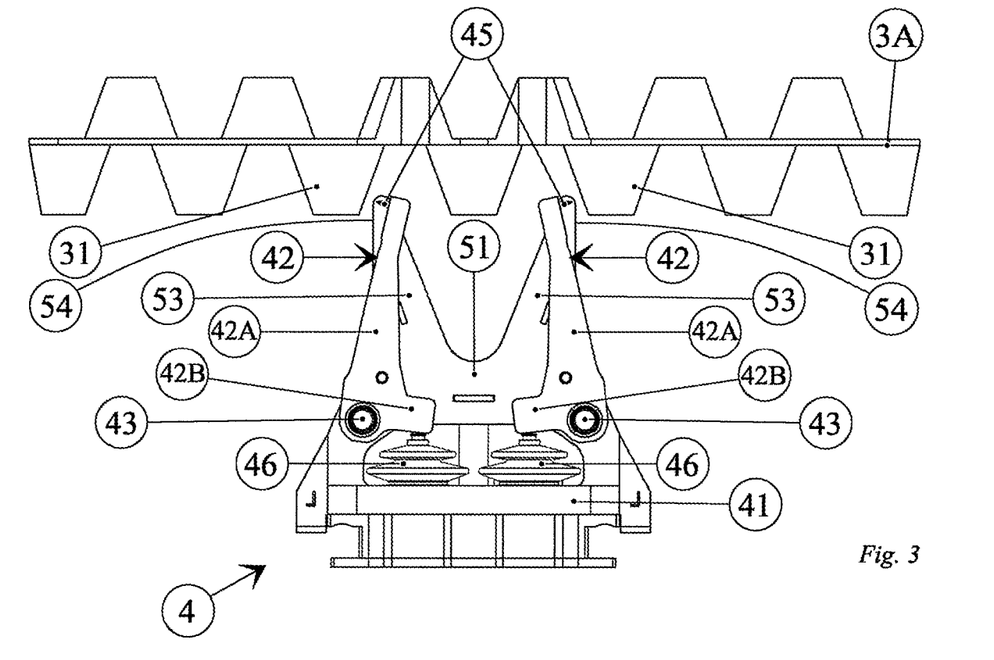
FIG. 3 shows the tray of FIG. 2 in a front view with gripping members of the gripping units in a retracted position.
Figure 4:
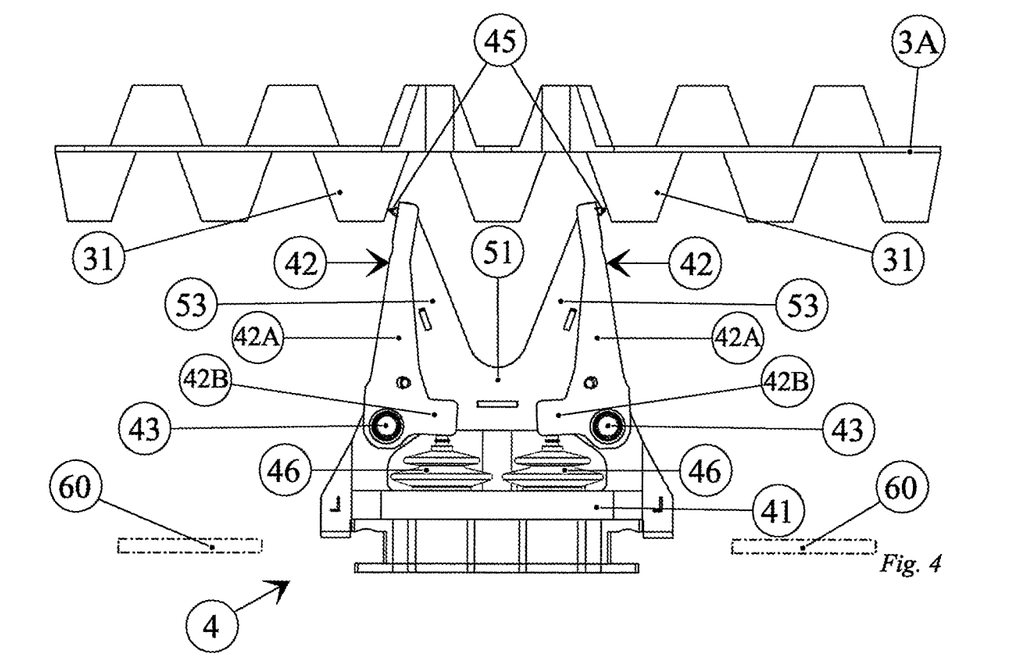
FIG. 4 shows the tray of FIG. 2 in a front view with gripping members of the gripping units in an advanced position engaging the tray.

In FIGS. 2-4 is shown a part of the denesting apparatus 1 of FIG. 1. The denesting apparatus 1 has two gripping units 4 that are arranged in line with each other as can be seen in FIG. 2.

Each gripping unit 4 has a base 41. The bases 41 of the respective gripping units 4 are interconnected by a support member, such that the gripping units 4 are moved up and down simultaneously to approach the lower tray 3A of the stack 2 and to pull the lowest tray 3A from the stack.

The gripping unit 4 has four levers 42 that are pivotably attached to the base 41 by a pivot 43. The lever 42 has two lever portions 42A and 42B that are positioned in an angled fashion with respect to each other. The longer lever portion 42A extends upwardly from the pivot 43 and has at an end portion a needle 45. A pneumatic actuator 46 is arranged on the base 41 and engages the shorter lever portion 42B. When air pressure is fed to the pneumatic actuator 46, the pneumatic actuator 46 will drive the lever portion 42B, and the lever will swivel around the pivot 43. The lever portion 42A will move with the needle 45 towards an adjacent dimple 31 and eventually grip it as is shown in FIG. 4.

The lever 42 is spring loaded with a spring 47, in this case a coil spring that engages a pin 49 provided on the lever 42. The spring 47 acts such that when the actuator 46 is not operated, the lever 42 will move to its starting position as is shown in FIG. 3.

Also another type of spring than the coil spring 47 may be used. Furthermore, it is noted that also an alternative for the spring 47 may be used, such as a pneumatic actuator that acts on the lever 42 and pushes the lever 42 back to its starting position. In that case the lever would be moved by a pneumatic actuator 46 to grip a tray 3A or other package, and would be moved the opposite direction by a similar pneumatic actuator.

The four levers 42 on the unit are distributed in two pairs of levers 42 as can be seen in FIG. 2. The levers of a pair swivel in opposite directions around their mutually parallel pivot axes. The paired levers 42 swivel with their longer lever portions 42A outwards, i.e. away from each other when the actuator 46 is operated and thus eventually engage a different dimple 31 of the tray 3.

In the specific embodiment shown in FIGS. 2-4, the shorter lever portion 42B extends in transverse direction from the pivot 43 towards the other pivot 43, such that when the actuator 46 is operated the needle 45 will be moved outwardly. It is noted here that many lever-actuator configurations are conceivable within the invention that achieve the same result. The configuration shown in FIGS. 2-4 is a practical example, but must not be considered as limiting. For example the lever does not need to be angled, but can be straight. And the actuator now acts in an up and down fashion, but may also be mounted in a horizontal fashion.

The gripping unit 4 also includes a frame 50 that has a front plate 51 and a rear plate 55. The front plate 51 and rear plate 55 of the gripping unit 4 are substantially parallel to each other. The pivots 43 are attached to the front and rear plates 51, 55.

In the embodiment shown in FIG. 2, the front plates 51 of the two gripping units 4 are facing outwards, while the two rear plates 55 are facing each other. In this case the front plate 51 and the rear plate 55 are not the same, but it is conceivable to make them the same.

The pin 49 on the lever extends through a (curved) slot hole 52 in the front plate 51 or rear plate 55, so as to allow the lever 42 to swivel around the pivot 43. The length of the slot hole 52 determines the maximal stroke that the lever 42 can make. The spring 47 is arranged on an inner side of the front plate 51.

The front and rear plates 51, 55 are interconnected by a connection plate 56, in this case a curved connection plate.

The front plate 51 has a pair of arms 53, wherein each arm 53 extends parallel and adjacent the lever portions 42A of the corresponding levers 42. The arms 53 have an outer edge 54. As can be seen in FIG. 3 the needles 45 of the lever portions 42A are with respect to the corresponding dimple 31 in a withdrawn position relative to the edge 54 of the corresponding arms 53. When the actuator 46 is operated with pressure, the lever swivels and the needle 45 moves beyond the outer edge 54 of the arm 53, such that it can engage the corresponding dimple as is shown in FIG. 4.

The outer edge 54 of the arm 53 has the effect that the egg tray 3A is retained while the needle 45 is retracted out of the tray material which may be papier-maché or cardboard. If the needle 45 is stuck in the tray material, the dimple concerned will move into contact with the outer edge 54 which in turn makes sure that the tray material is stripped off the needle. This provides the advantage that the tray 3A is released properly and that the tray 3A is not positioned obliquely on a further conveyor.

The further conveyor may comprise two parallel belts 60 indicated in FIG. 4 in dashed lines and extending perpendicular to the plane of the drawing. Also another conveyor type may be used.

The gripping units 4 move up and down between the two belts 60 so as to grip a tray 3A and place it on the belts 60. The belts 60 convey the tray 3A to a further conveyor or handling device.

Because the needles 45 are withdrawn relative to the respective edges 54 an increased safety for the personnel operating the apparatus is provided. The withdrawn position shields the sharp needles (cf. FIG. 3). The operating personnel will have less risk to wound itself when doing maintenance work or solve failure of the apparatus.

The arm 53 thus functions as a stop member positioned adjacent each one of the gripping members, i.e. the needles 45, wherein the gripping member 45 in the advanced position extends beyond the stop member. In the retracted position (FIG. 3) the gripping member 45 is withdrawn relative to the stop member.

It is noted that the working of the embodiment shown in FIGS. 2-4 in principle is the same as in the schematic illustration with reference to FIG. 7. The pneumatic actuators 46 are fed from a common pressure source whereby the force with which the respective needles engage 45 the respective dimples 31 is equal.

The invention claimed is:

1. A gripping device for gripping a package having a dimpled structure,
   the gripping device including a gripping unit that is movable up and down to engage and grip the package and move it,
   said gripping unit comprising at least a pair of opposite gripping members which are movable in opposite directions, substantially transverse to the up and down movement of the unit, from a retracted position to an advanced position to grip a dimple of the package, and from the advanced position to the retracted position to release the dimple, each gripping member comprising a pointed element to prick the material of the dimple to grip it,
   wherein each gripping member of said pair has a separate pressure operated actuator operatively connected to it, which actuator, upon pressurization, moves the corresponding gripper from the retracted position to the advanced position, whereby each respective gripping member is allowed to travel individually over the required distance from the retracted position to the advanced position to grip a respective dimple.

2. The gripping device according to claim 1, wherein the actuators are connected to a common pressure source, such that all actuators are operated with the same pressure, whereby all gripping members engage the respective dimples of the package with the same force independent of the distance the respective gripping member has to travel between the retracted position and the advanced position in which it grips the respective dimple.

3. The gripping device according to claim 1, wherein the pressure actuated actuator is a pneumatic actuator.

4. The gripping device according to claim 1, wherein the gripping unit comprises a stop member positioned adjacent each one of the gripping members, and wherein the gripping member in the advanced position extends beyond the stop member and in the retracted position is withdrawn relative to the stop member.

5. The gripping device according to claim 1, wherein the gripping unit has two pairs of gripping members.

6. The gripping device according to claim 1, wherein the device has a plurality of gripping units.

7. The gripping device according to claim 1, wherein each of the gripping members is mounted on a lever arm which is pivotally mounted to a gripping unit base and wherein the actuator operates on one end of the lever arm and the gripping member is mounted on the other end adapted to engage the dimple of the package.

8. A denesting apparatus for denesting and discharging a lower tray of a stack of nested packages having a dimpled structure, wherein the denesting apparatus includes a gripping device to engage and grip the lower package of the stack and to separate the lower package from the stack,
   the gripping device including a gripping unit that is movable up and down to engage and grip the package and move it,
   said gripping unit comprising at least a pair of opposite gripping members which are movable in opposite directions, substantially transverse to the up and down movement of the unit, from a retracted position to an advanced position to grip a dimple of the package, and from the advanced position to the retracted position to release the dimple, each gripping member comprising a pointed element to prick the material of the dimple to grip it,
   wherein each gripping member of said pair has a separate pressure operated actuator operatively connected to it, which actuator, upon pressurization, moves the corresponding gripper from the retracted position to the advanced position, whereby each respective gripping member is allowed to travel individually over the required distance from the retracted position to the advanced position to grip a respective dimple.

9. A denesting apparatus for denesting and discharging a lower package of a stack of nested packages having a dimpled structure, wherein each dimple is adapted to receive a product such as an egg or fruit and isolate it from other same products placed in the package,
- the gripping device including a gripping unit that is movable up and down to engage and grip the package, said gripping unit comprising at least two gripping members operating in a mutual opposite direction and each movable in a substantially transverse direction from an advanced position to a retracted position and vice versa to so as to grip and to release each a dimple of the tray or carton,
- wherein each of the gripping members is operatively connected to a separate actuator to move the gripping members to and from the advanced position and retracted position.

10. The denesting apparatus according to claim 9, wherein each of the gripping members comprises at least one pointed element such as a gripping pin, in particular a gripping needle.

11. The denesting apparatus according to claim 9, wherein the actuator is a pressure operated actuator.

12. The denesting apparatus according to claim 11, wherein the actuator is a pneumatic actuator.

13. The denesting apparatus according to claim 11, wherein the actuators are connected to a common pressure source.

14. The denesting apparatus according to claim 9, wherein the actuator includes a spring element.

15. The denesting apparatus according to claim 9, wherein the gripping unit comprises a stop member positioned adjacent each one of the gripping members, and wherein the gripping member in the advanced position extends beyond the stop member and in the retracted position is withdrawn relative to the stop member.

16. The denesting apparatus according to claim 9, wherein the gripping unit has two pairs of gripping members.

17. The denesting apparatus according to claim 9, wherein the gripping device has a plurality of gripping units.

18. The denesting apparatus according to claim 9, wherein each of the gripping members is mounted on a lever arm which is pivotally mounted to a gripping unit base and wherein the actuator operates on one end of the lever arm and the gripping member is mounted on the other end adapted to engage the dimple of the package.

19. A gripping device for gripping a package having a dimpled structure, wherein each dimple is adapted to receive a product such as an egg or fruit and isolate it from other same products placed in the package,
- the gripping device including a gripping unit that is movable up and down to engage and grip the package, said gripping unit comprising at least two gripping members operating in a mutual opposite direction and each movable in a substantially transverse direction from an advanced position to a retracted position and vice versa to so as to grip and to release each a dimple of the tray or carton,
- wherein the gripping unit comprises a stop member positioned adjacent each one of the gripping members, and wherein the gripping member in the advanced position extends beyond the stop member and in the retracted position is withdrawn relative to the stop member.

* * * * *